(12) United States Patent
Nielsen

(10) Patent No.: US 7,040,055 B2
(45) Date of Patent: *May 9, 2006

(54) CAPILAR CONTROLLED WATERING OF PLANTS

(75) Inventor: Rune Nielsen, Odense (DK)

(73) Assignee: Gartneriet PKM APS, (DK)

(*) Notice: Subject to any disclaimer, the term of this patent is extended or adjusted under 35 U.S.C. 154(b) by 21 days.

This patent is subject to a terminal disclaimer.

(21) Appl. No.: 10/488,871

(22) PCT Filed: Sep. 6, 2002

(86) PCT No.: PCT/DK02/00578

§ 371 (c)(1),
(2), (4) Date: Mar. 8, 2004

(87) PCT Pub. No.: WO03/022038

PCT Pub. Date: Mar. 20, 2003

(65) Prior Publication Data

US 2004/0237402 A1    Dec. 2, 2004

(51) Int. Cl.
*A01G 25/00* (2006.01)

(52) U.S. Cl. .................................................. 47/80
(58) Field of Classification Search ............ 47/19.1, 47/59 R, 59 S, 63, 64, 79–82, 85
See application file for complete search history.

(56) References Cited

U.S. PATENT DOCUMENTS

| | | | | |
|---|---|---|---|---|
| 2,814,161 A | * | 11/1957 | Hawkins | 47/80 |
| 3,067,543 A | * | 12/1962 | Raymond | 47/80 |
| 4,231,188 A | * | 11/1980 | McGuire et al. | 47/80 |
| 5,193,306 A | * | 3/1993 | Whisenant | 47/65.8 |
| 6,178,691 B1 | * | 1/2001 | Caron et al. | 47/79 |
| 6,536,159 B1 | * | 3/2003 | Van Den Ende | 47/66.1 |
| 2004/0237386 A1 | * | 12/2004 | Madsen et al. | 47/1.01 P |

FOREIGN PATENT DOCUMENTS

WO   WO 9603030 A1  *  2/1996
WO   WO 2004017718 A1  *  3/2004

* cited by examiner

*Primary Examiner*—Francis T. Palo
(74) *Attorney, Agent, or Firm*—Stites & Harbison PLLC; Marvin Petry

(57) ABSTRACT

The present invention relates to a method and container for the cultivation of ornamental plants, facilitating the application of the method of drought stress to reduce cell elongation of plants grown in a slowly absorbing material such as peat moss without the use of chemical retarding agents. The invention thus discloses a container for the cultivation of plants comprising a layered structure incorporating a rapidly liquid absorbing reservoir and a body of suitable cultivation substrate. According to an advantageous embodiment a layer is furthermore inserted between said reservoir and said cultivation substrate in order to obtain a controlled flow of liquid from said reservoir to said cultivation substrate.

18 Claims, 3 Drawing Sheets

CAPILAR CONTROLLED WATERING OF PLANTS

TECHNICAL FIELD

The present invention relates to a method and container for the cultivation of ornamental plants.

BACKGROUND OF THE INVENTION

A technique for controlling the cell elongation of plants with a reduced application of chemical retarding agents is known within the art as drought stress. The reduction of the application of chemical retarding agents is highly desirable from an environmental point of view. Furthermore the durability of plants in which the growth has been retarded by the application of drought stress has been shown to be improved [1].

[1] Lise Anderson, Michelle H. Williams: "Hold igen med vandingen " Gartner tidende, bind 116, nr. 48, p.20–22, (2000).

One of the problems with the application of a traditional cultivation substrate such as peat moss in connection with the application of the technique of drought stress is the following:

The majority of pot plants commercially produced are grown in a traditional cultivation substrate such as peat moss. However peat moss suffers from a number of disadvantages which are especially serious in connection with the conditions prevailing under drought stress. Specifically the ability of peat moss to absorb water is reduced when the moisture content of the peat moss is low. Consequently it becomes in practice difficult to approach the drought limit because this reduced ability to absorb water may prevent the driest plants from receiving water at all. A consequence of these watering problems is that the uniformity of the plants is reduced and hence an increased waste of plants in a production is generally the result.

A typical problem in connection with watering of pot plants especially by the customer furthermore results from an excessively large supply of water resulting in the formation of a layer of water at the bottom of the flower pot and associated flower pot saucer. In this case the roots of the plant in the pot will suffer from suffocation due to a lack of sufficient air supply to the roots. It would thus be advantageous to provide a bottom portion in the flower pot into which portion the roots of the plant does not penetrate, the thickness of this bottom portion being for Instance equal to or larger than the depth of an associated flower pot saucer.

DISCLOSURE OF THE INVENTION

Based on the above background of the invention it is an object of the present invention to provide a method and a container for the cultivation of plants which allows the application of drought stress to control the cell elongation of plants without the application of chemical retarding agents which method and container does not give rise to the problems connected with the application of drought stress described above.

It is a further object of the present invention to provide a method and container for the cultivation of plants which at least substantially solves the above mentioned problem of the risk of suffocation of the roots of the plants resulting from an excessive supply of water.

These and other objects are attained with a method and a container as discussed hereinbelow. Various embodiments of the invention are defined as well hereinbelow.

According to the invention a very accurate dosage of the cultivation liquid supply to each individual plant as required for instance when said technique of drought stress to control the growth of plants is applied can be obtained by providing said pots or containers with a rapidly absorbing reservoir which can absorb a sufficient amount of cultivation liquid (i.e. water possibly mixed with a suitable fertilizer) from a supply of such cultivation liquid and thereafter gradually pass the absorbed cultivation liquid on to the plant(s) in said pot or container.

In the context of the present invention the term "rapidly absorbing" should simply means that the rapidly absorbing material is able to absorb a given quantity of liquid more rapidly than the cultivation substance used in the particular case will be able to absorb a similar quantity.

A possible way of implementing said rapidly absorbing reservoir is to provide a pot or container comprising one or more access openings for cultivation liquid at the bottom surface thereof with a layer of rapidly absorbing material immediately above these access openings, above which rapidly absorbing layer a layer of suitable cultivation substance containing a least a major portion of the roots of the plant is provided. The cultivation substance will absorb water and fertilizer directly from the reservoir layer at a slower rate than the rate by which liquid is absorbed from the liquid supply by the rapidly absorbing layer. In practice a number of materials can be suitable for each of these layers. One of the characteristics determining the rate of absorption of the material will be the dimension of the pores of the material, a large pore size providing a relatively more rapid absorption of liquid than a smaller pore size. A specific embodiment of a layered reservoir system of the above kind will be discussed in the detailed description of the invention.

Furthermore, if the above method and container is to be applied in connection with traditional watering systems in production plants in greenhouses, where the plants are supplied with water during a time interval of for instance 20 to 40 minutes, water may penetrate from the rapidly absorbing layer throughout the total volume of cultivation substrate and a controlled drought stress effect will not be obtained. If in such production plants it is required that only the rapidly absorbing layer be filled with water during the watering sessions, means must be interposed between the rapidly absorbing layer and the cultivation substrate for controlling the flow of water from the rapidly absorbing layer to the cultivation substrate. According to one embodiment of the present invention, this controlling means is provided by a thin layer of liquid impermeable material provided with a pattern of through holes providing controlled liquid communication between the rapidly absorbing layer and the cultivation substance. Other means such as a layer of slowly liquid permeable material of sufficient thickness should also be used, and other equivalent means may be devised by a person skilled in the art without departing from the scope of the present invention as defined in the claims.

BRIEF DESCRIPTION OF THE DRAWINGS

The invention will now be described in more detail with reference to the accompanying drawings, in which.

DETAILED DESCRIPTION OF THE INVENTION

In the following a detailed description of one embodiment of the invention is given.

Figure 1:
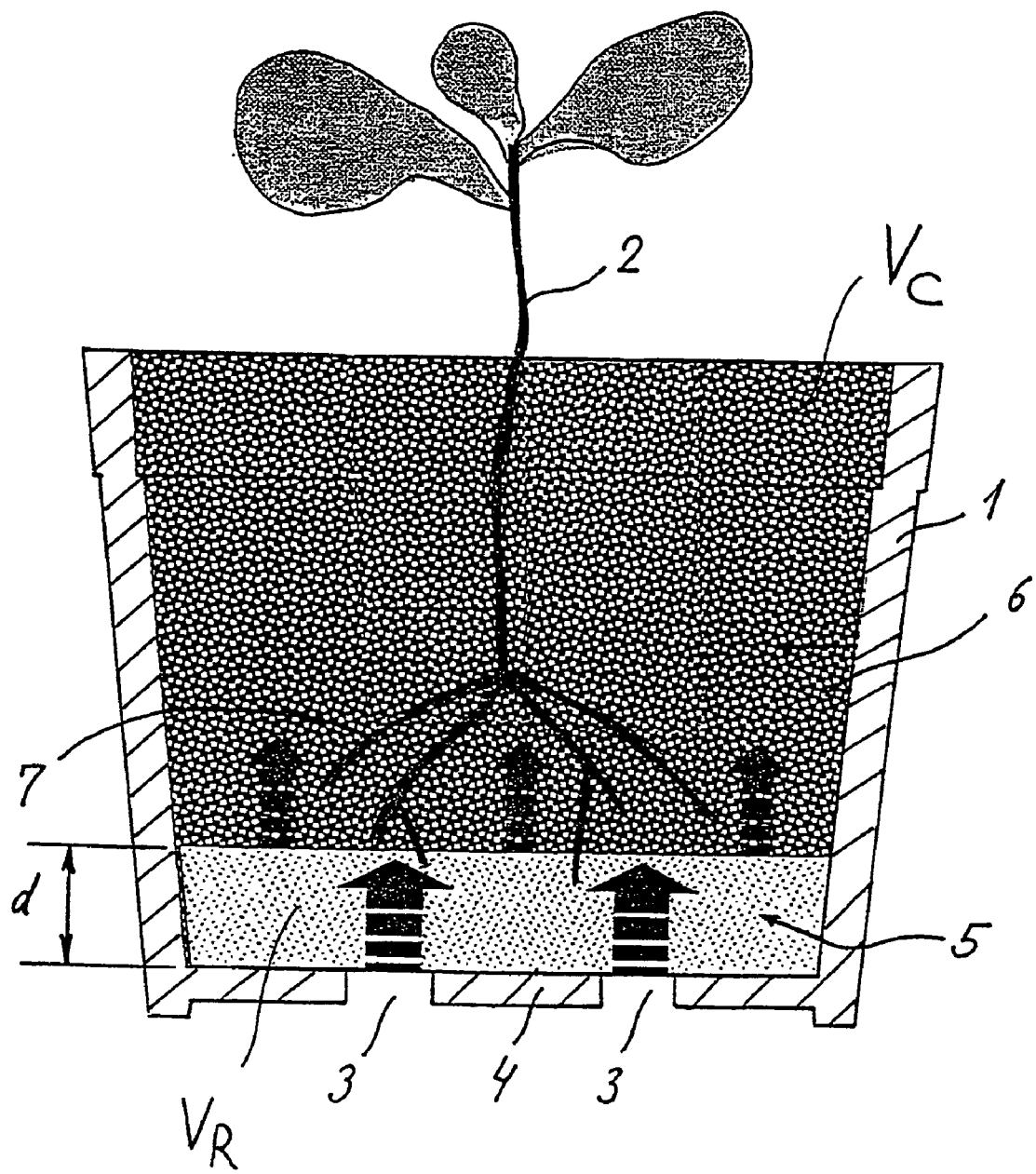
FIG. 1 is a cross-sectional view of a flowerpot comprising material according to a first embodiment the invention.

Referring to FIG. 1 there is shown an embodiment of a pot 1 according to the present invention. The pot 1 comprises a number of access openings 3 distributed over the bottom face 4 of the pot. Directly above these access openings 3 there is located said rapidly absorbing reservoir, which according to this embodiment consists of a layer 5 of a porous material with relatively large pores and hence the ability to rapidly absorb a liquid via the access openings 3 from a liquid source (not shown) and also to contain a relatively large amount of such liquid. Above and in contact with the layer 5 there is provided a second porous layer 6 of a suitable cultivation substance such as peat moss with relatively smaller pores than layer 5. When the reservoir layer 5 has been filled with liquid the liquid is gradually sucked up into the cultivation layer 6, from where it is absorbed by the roots 7 of the plant 2.

One advantage of the application of a pot of the kind described above is, that when drought stress is applied in a production process there will be no problems of providing the plants with cultivation liquid, even though the cultivation substance 6 initially is in a very dry state. Furthermore as the size of the pores in layer 5 is relatively large and in layer 6 much smaller the additional advantageous side effect is obtained that the reservoir layer 5 will dry up faster than the cultivation layer 6, because the larger capillary rise pressure of the smaller pores of layer 6 empties this layer 5 for liquid, thus leaving a dry zone at the bottom of the pot. The roots 7 of the plant will therefore only penetrate a short distance into the dry reservoir layer and not fill up the bottom portion of the pot. Thus in case of too large supply of liquid at the end, the roots will not suffer from suffocation due to lack of air supply to the same extent as traditionally cultivated plants.

According to the above embodiment of the present invention the volume of the reservoir layer 5 will be approximately 20 to 25% of the total volume of the reservoir layer 5 and the cultivation substrate 6. Under certain circumstances the volume of the reservoir layer 5 may however be reduced to approximately 10% of the total volume (when the amount of liquid supplied during each watering session is to be very limited). A volume of the reservoir layer 5 of up to approximately 40% of the total volume may however be relevant in certain other cases.

Figure 2:
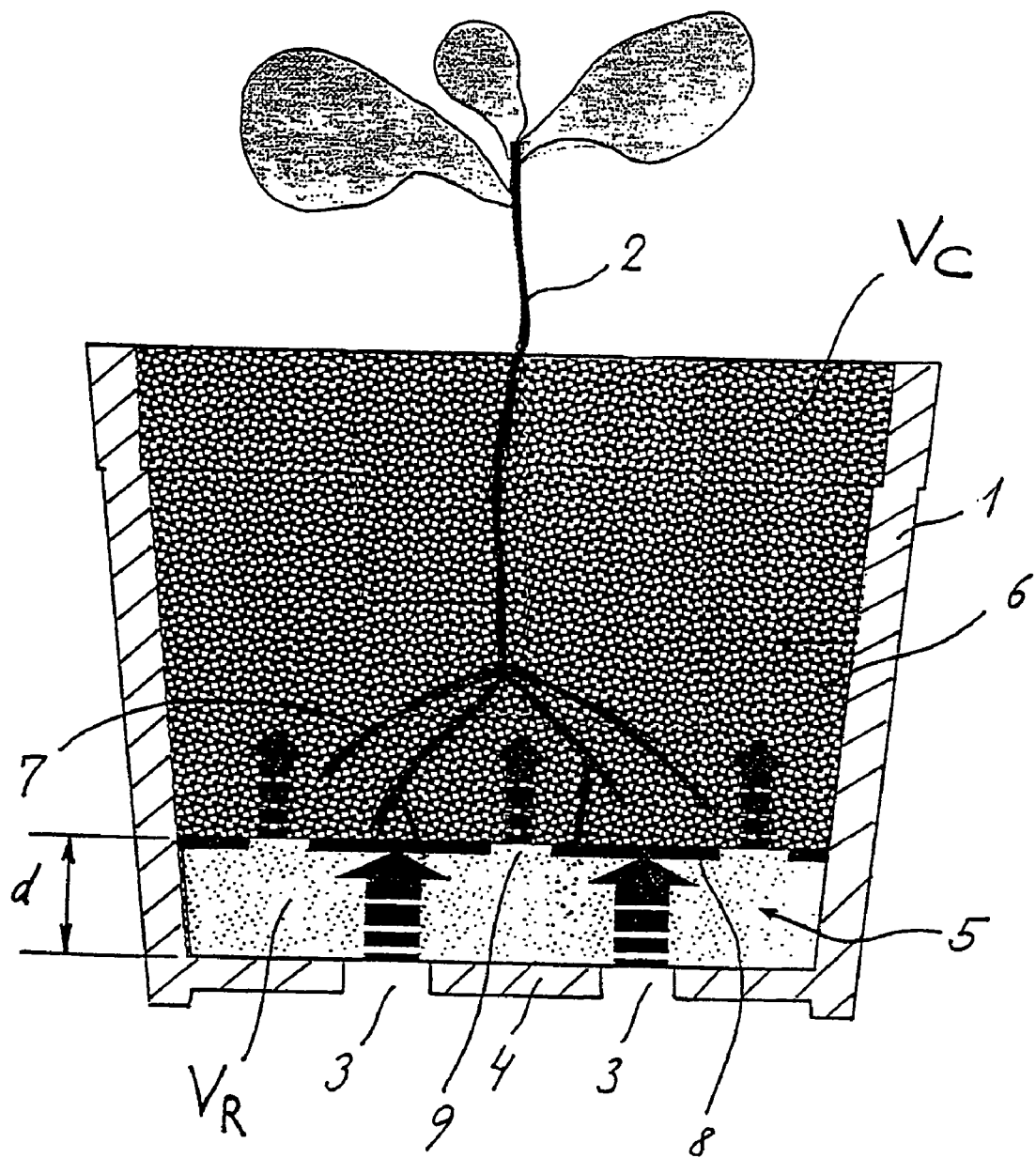
FIG. 2 is a cross sectional view of a flower pot comprising material according to a second embodiment of the invention.

Referring to FIG. 2 there is shown a second embodiment of the present invention comprising a liquid flow controlling means interposed between the reservoir layer 5 and the cultivation substance 6. According to this embodiment, said controlling means is provided by a thin film 8 made from a liquid impermeable material and provided by a suitable number of through holes 9 for liquid communication between the reservoir layer 5 and the cultivation layer 6. The flow of liquid can in this manner be controlled for instance through a proper dimensioning of the diameter of the holes 9 and the thickness of the film 8 and also by the choice of the numbers of the holes 9.

Figure 3:
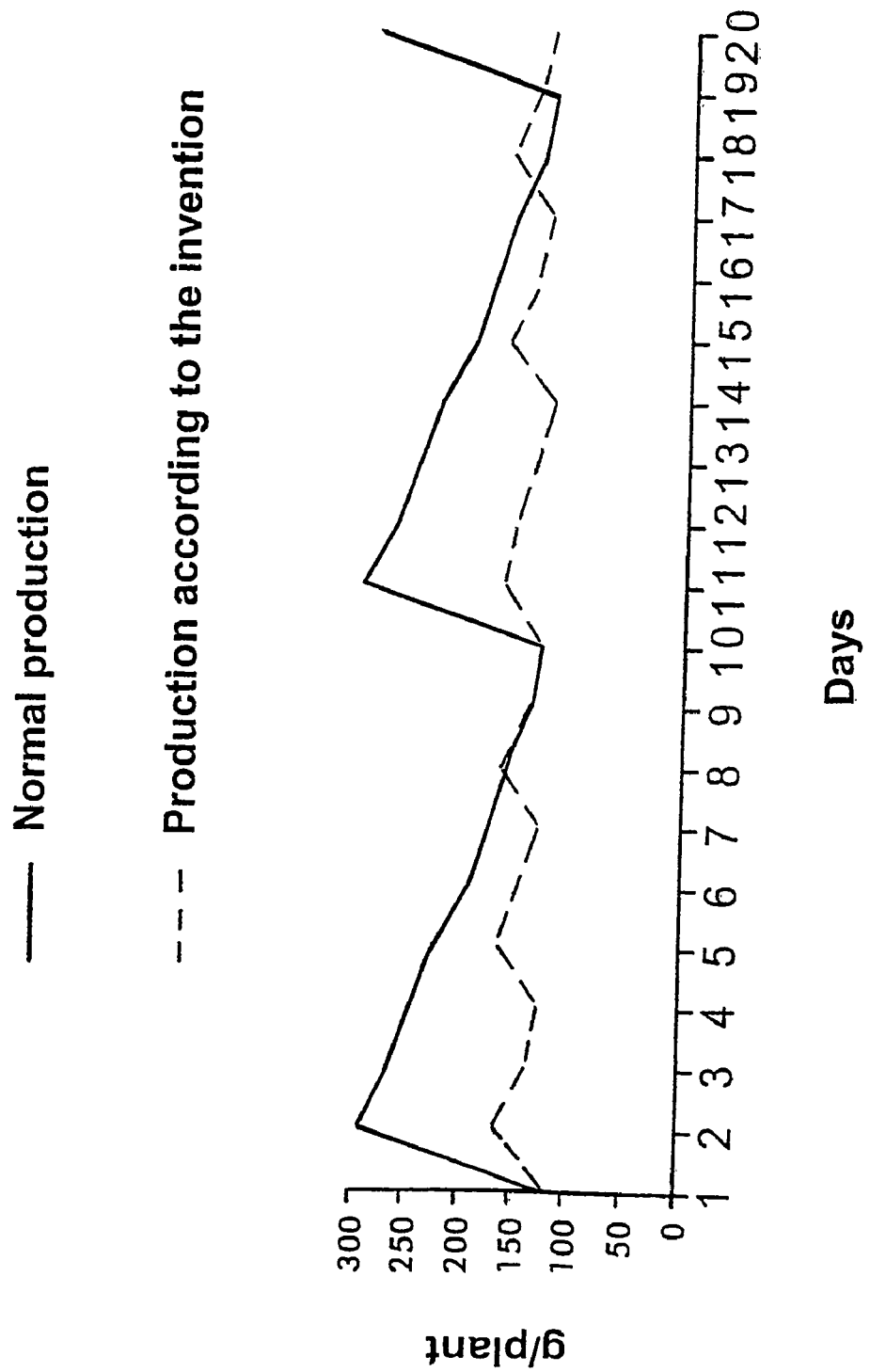
FIG. 3 is a graph over gross weight of container for a normal production method applying drought stress and for a similar method applying a container according to the present invention.

Referring to FIG. 3 there is shown a graph over the gross weight of a pot (i.e. the material in the pot and the plant) as a function of time for a traditional production system applying the drought stress technique for controlling the growth of plants but not applying pots with a reservoir layer according to the invention and for a production system applying pots according to the present invention. It is evident from the graph that there will be, in the case of traditionally drought stress grown plants, large intervals of time (several days) after the supply of liquid has taken place, where no drought stress effect will occur at all. In fact only some 10 to 20 percent of the production time a drought stress effect will be obtained. On the other hand in case of applying pots according to the present invention in the production system, it will be possible to increase and decrease the degree of drought stress by changing the lower weight limit determining whether liquid should be supplied. For a more detailed discussion of a possible production system applying pots or containers according to the invention, reference is made to co-pending patent application Ser. No. 10/488,865 entitled: "Production method and system for ornamental plants", with the same applicant as the present application.

Although one embodiment of the present invention has been shown and described in the preceding parts of the detailed description it is understood that a person skilled in the art may conceive other embodiments of the invention without departing from the scope of the invention as defined by the following claims.

The invention claimed is:

1. A method for the application of drought stress during the production of ornamental plants comprising the steps of:
   a) providing a cultivation substrate in a container, the cultivation substrate containing at least a major part of the roots of said ornamental plants and absorbing liquid at a slow rate when the cultivation substrate is in a dry state;
   b) retaining a cultivation liquid in a reservoir which reservoir is located in the container below the cultivation substrate, said reservoir being in liquid communication with said cultivation substrate;
   c) providing a liquid communication through a bottom of the container between cultivation liquid located therebelow and said reservoir, whereby said reservoir absorbs an amount of cultivation liquid and thereby becomes partly or completely filled with said cultivation liquid;
   d) migrating said cultivation liquid gradually from said reservoir to said cultivation substrate; whereby an accurate dosage of cultivation liquid to the individual ornamental plants, necessary to attain and maintain drought stress conditions for each individual plant, can be provided.

2. A method according to claim 1, characterized in that a rate of absorption of cultivation liquid by said reservoir is greater than a rate of said migrating of cultivation liquid from the reservoir to said cultivation substrate.

3. A method according to claim 1, characterized in that said liquid communication between said reservoir and said cultivation substrate is controlled by the introduction of a liquid communication control device between said reservoir and said cultivation substrate.

4. A method according to claim 1, characterized in that said cultivation substrate is peat moss.

5. A method according to claim 1, characterized in that said reservoir is formed as a layer of thickness and volume positioned at the bottom of the container, where said layer is in liquid communication with said cultivation liquid via at least one access port in said container.

6. A method according to claim 3, characterized in that said liquid communication control device comprises a liquid impermeable layer inserted between said reservoir and said cultivation substrate, said liquid impermeable layer being provided with one or more through holes.

7. A method according to claim 1, characterized in that said reservoir is formed by a rapidly absorbing porous material of a large pore size.

8. A method according claim 7, characterized in that said cultivation substrate is formed of a material having a pore size smaller than the large pore size of said rapidly absorbing porous material forming said reservoir.

9. A method according to claim 5, characterized in that said reservoir has a volume within the range 10% to 40% of the total volume of the reservoir and the cultivation substrate.

10. A method, according to claim 5, characterized in that said reservoir has a volume within the range 20% to 25% of the total volume of the reservoir and the cultivation substrate.

11. A container for the cultivation of ornamental plants under drought stress conditions comprising:
- a liquid retaining reservoir located at a bottom of said container which can communicate with a supply of liquid below the bottom of said container; and
- a cultivation substrate above said reservoir and in said container, which said reservoir is furthermore in liquid communication with said cultivation substrate and gradually passes the liquid contained in the reservoir thereto, and which said cultivation substrate is suitable for the cultivation of said plants and contains at least a major portion of the roots of said plants, wherein said cultivation substrate absorbs liquid at a slow rate when the cultivation substrate is in a dry state.

12. A container according to claim 11, characterized in that said cultivation substrate is peat moss.

13. A container according to claim 11, characterized in that said reservoir is formed as a layer of thickness and volume positioned at the bottom portion of said container in liquid communication with at least one access port in the bottom for the provision of said cultivation liquid to said reservoir.

14. A container according to claim 11, characterized in that said liquid communication between said reservoir and said cultivation substrate is provided through a liquid impermeable layer inserted between said reservoir and said cultivation substrate, said liquid impermeable layer being provided with one or more through holes.

15. A container according to claim 11, characterized in that said reservoir is formed by a rapidly absorbing porous material of a large pore size.

16. A container according to claim 11, characterized in that said cultivation substrate is formed by a material having a pore size smaller than the large pore size of said rapidly absorbing porous material forming said reservoir.

17. A container according to claim 11, characterized in that said reservoir has a volume within the range 10% to 40% of the total volume of the reservoir layer and the cultivation substrate.

18. A container according to claim 11, characterized in that said reservoir has a volume within the range 20% to 25% of the total volume of the reservoir layer and the substrate.

* * * * *